Feb. 26, 1963  W. W. McGRAW  3,079,201
DUAL WHEEL ASSEMBLY FOR COAL CUTTING MACHINES
Filed Oct. 5, 1960  4 Sheets-Sheet 2

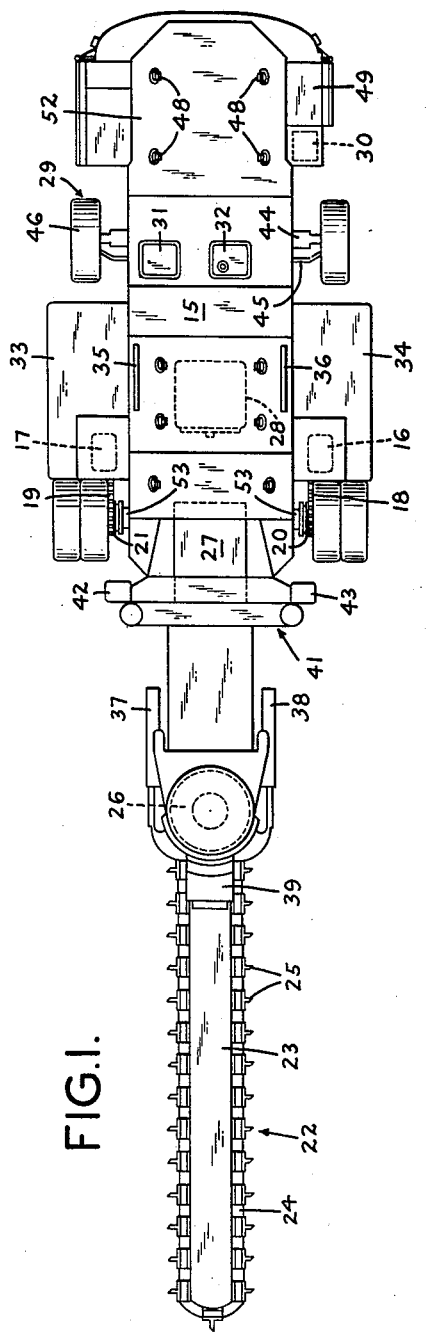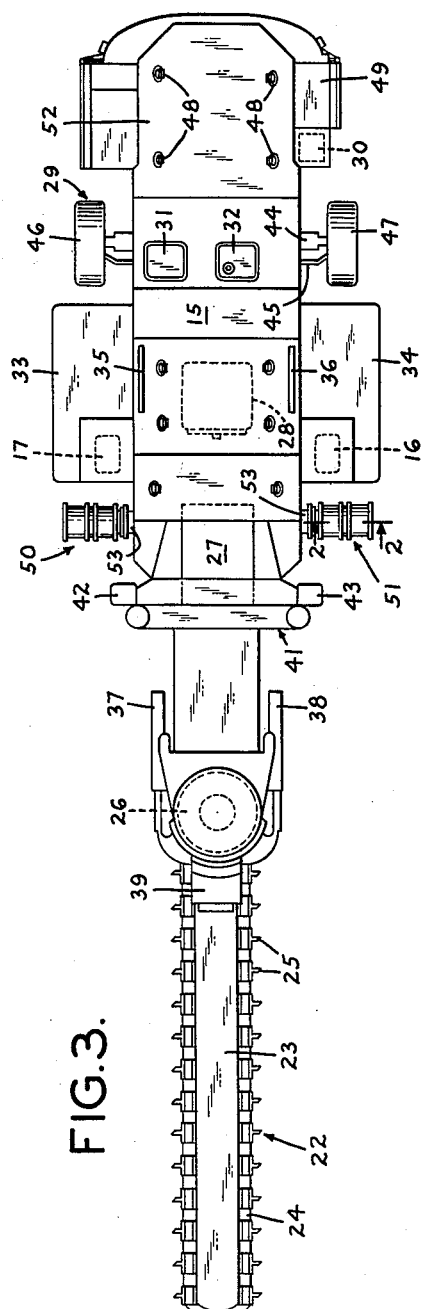

INVENTOR
WOODROW W. McGRAW
BY
ATTORNEY

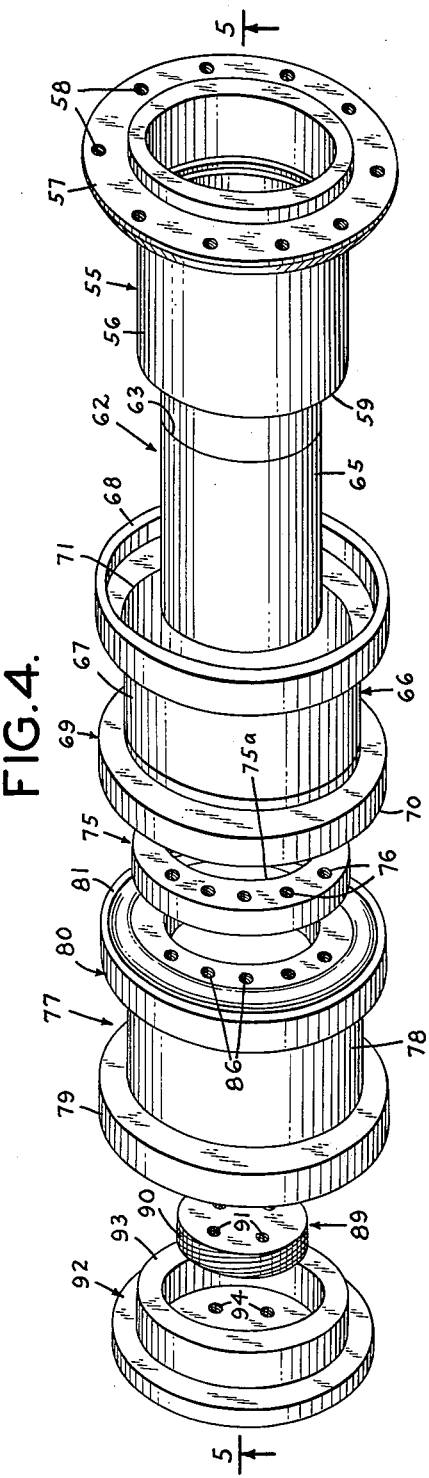
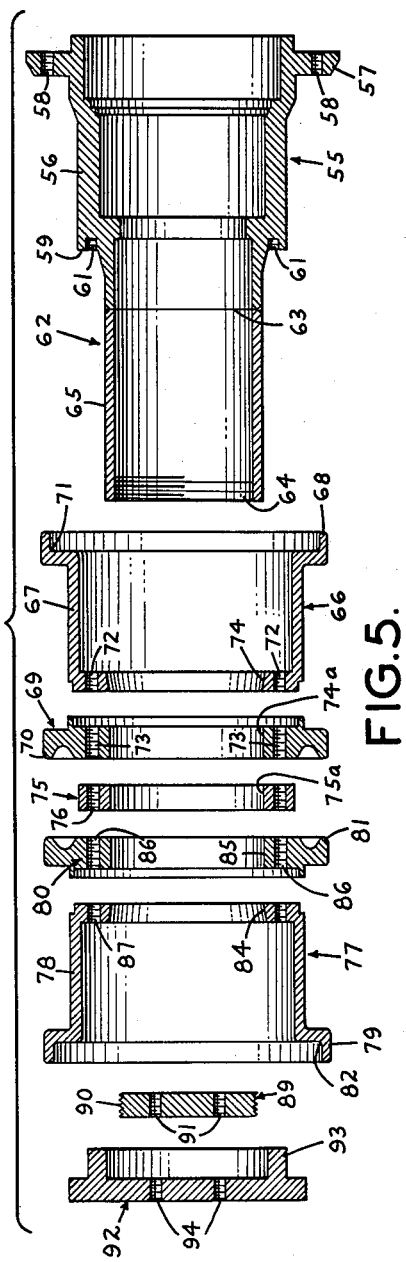

Feb. 26, 1963 W. W. McGRAW 3,079,201
DUAL WHEEL ASSEMBLY FOR COAL CUTTING MACHINES
Filed Oct. 5. 1960 4 Sheets—Sheet 4
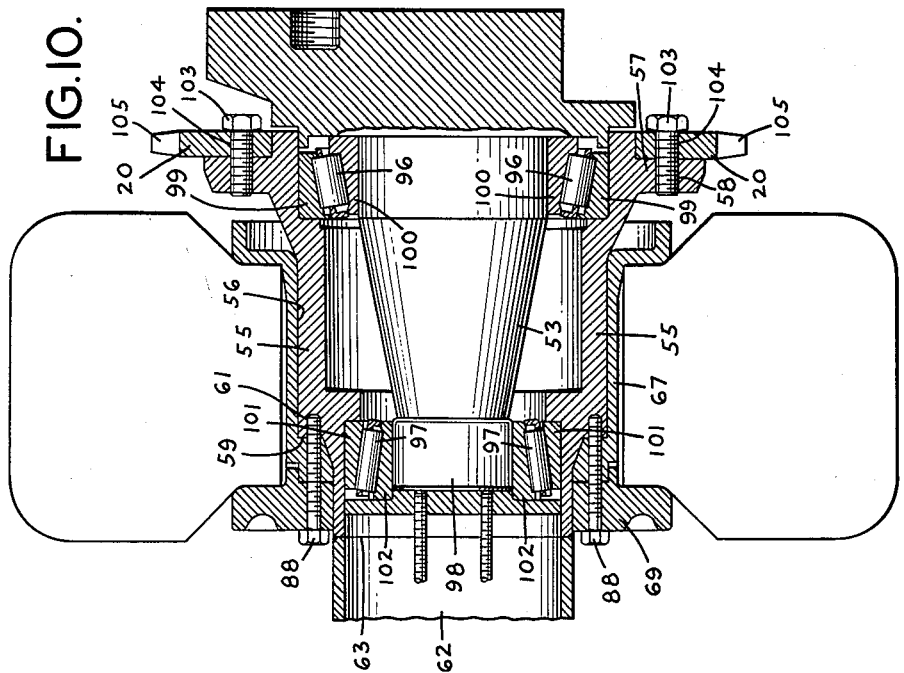
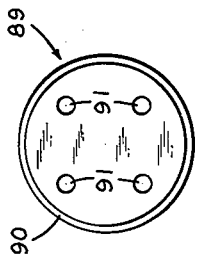
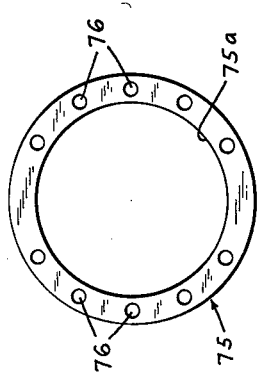
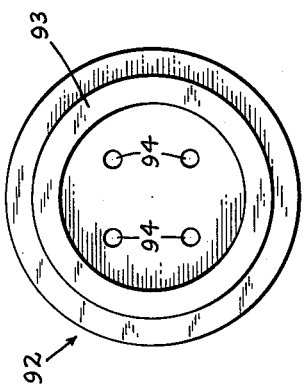
INVENTOR
WOODROW W. McGRAW
BY
*Alvin Engelstein*
ATTORNEY

2

United States Patent Office 3,079,201
Patented Feb. 26, 1963

3,079,201
DUAL WHEEL ASSEMBLY FOR COAL
CUTTING MACHINES
Woodrow W. McGraw, Mullens, W. Va., assignor to Allied Chemical Corporation, New York, N.Y., a corporation of New York
Filed Oct. 5, 1960, Ser. No. 60,606
2 Claims. (Cl. 301—36)

This invention relates to coal cutting machines and more particularly to improvements in coal cutting machines achieving improved sumping and improved cutting by the machines.

In coal mining, an important step in actually getting the coal out of the mine is the cutting operation. In this cutting operation one or more deep slots are cut across the face of the coal vein. These cuts weaken the seam and enable the coal to expand and break up during the blasting operation. In modern coal mining, the cutting operation is generally entirely mechanical. The mechanical cutter typically used is a mobile device having a long cutter bar extending forwardly at the front of the machine. An endless electrically-driven chain mounting sharp projecting cutting bits is circulated around the bar and when the bar is contacted with the vein face, the bits cut a horizontal slot of considerable depth therein. After the cutting operation, holes are drilled in the vein face and explosives inserted for the blasting operation.

While the cutting machine has been satisfactory in certain respects, it has left room for improvement particularly with respect to slot cutting and sumping, i.e. the forward advance of the cutter bar for substantially its entire length into the coal vein prior to moving the bar horizontally to cut the slot. One difficulty encountered has been the sway or side to side movement of the machine when the cutter bar cuts horizontally through the coal vein, this side to side movement resulting in a substantial slowing down of the cutting. Another difficulty encountered has been when the machine sumps, it tends to move backwards and also may sway which materially hinders and slows down the sumping. A third difficulty encountered is that the drive tram chains and drive sprockets of the machine not infrequently break and the hydraulic tram motors, hydraulic valve chest and hydraulic hose connections have a tendency to break down due to the non-desired movement of the machine during the cutting and sumping. This breaking down of the machine has resulted in considerable "down time" with attendant financial loss.

An object of the present invention is to provide a dual wheel assembly for the front axle of coal cutting machines by direct conversion of single wheel assemblies on such machines to a dual wheel assembly, thereby improving the cutting and sumping rates and reducing the maintenance and other operating costs of such machines.

Additional objects and advantages will be apparent as the inventions is hereafter described in more detail.

The coal cutting machine improved by the present invention comprises a main frame adapted to move in a forward direction toward the face of a mine coal vein, power means for causing said frame to move forward, and a cutting mechanism comprising a generally rectangular-shaped guide frame of greater length than width mounted in the forward end of the main frame. An endless driven loop chain mounting a plurality of spaced, sharp, projecting cutting bits is arranged and guided for circulation about the guide frame for forming a kerf of substantial depth (depending on length of cutter bar) in the vein face as the main frame is moved forward. A rear axle is supported on the rear portion of the main frame for detachably securing a single wheel (mounting single tires) at each end, and a forward axle is supported on the forward end portion of the main frame. In accordance with the present invention, it was found after considerable experimental work that only by mounting and securing a novel dual wheel assembly mounting dual tires at each end portion of only the front axle of the cutting machine and retaining the single wheels mounting the single tires each secured at each end of the rear axle was the disadvantageous sway, i.e. side to side movement, and backward movement eliminated during the cutting and sumping by the machine, and considerably improved cutting and sumping achieved. The dual wheel assemblies of the invention each comprise a hub mounted at the outer end portion of the forward axle and having a peripheral seat for mounting a first wheel, a hub extension member engaging the hub and integral therewith, the hub extension member having a peripheral seat for mounting a second wheel, and a first wheel mounted on the peripheral seat of the hub. A spacer member having a central opening of larger diameter than that of the hub extension member is mounted on the hub extension member with the spacer inner edge face in engagement with an outer edge face of the first wheel, and a second wheel is mounted on the peripheral seat of the hub extension member with the inner edge face of the second wheel engaging the outer edge face of the spacer member. The first and second wheels each comprise a tire-mounting rim having a central opening of larger diameter than that of the hub and hub extension member respectively, and connecting and supporting means between the opening and the rim. Securing means for instance bolts, such as capscrews, secure the first wheel, spacer and second wheel in assembled relation and to the hub. Tires are mounted on the rims of the first and second wheels of each dual wheel assembly, and means are secured to the outer end of the hub extension member to impart additional strength and stability to the outer end portion of the assembly. Securing of the dual wheel assemblies to the outer end portions of the rear axles in addition to the front axles is unsatisfactory because the cutting machine becomes more difficult to steer and the clearance space for installation of the dual assembly more restricted.

For a better understanding of the present invention, reference is now made to the accompanying drawings wherein:

FIG. 1 is a top plan view of the improved coal cutting machine of the invention;

FIG. 3 is a top plan view of the improved coal cutting machine of the invention, the tires for the forward dual wheel assemblies and certain other parts of the machine not shown for purposes of clarity in showing detail;

FIG. 4 is a perspective view of the dual wheel assembly with the elements disassembled;

FIG. 5 is a detail sectional view taken generally on line 5—5 of FIG. 4;

FIG. 7 is a side view of a spacer member of the dual wheel assembly of the invention;

FIG. 8 is a side view of a screw-threaded disk of the dual wheel assembly;

FIG. 9 is a side view of an end plate of the dual wheel assembly;

FIG. 10 is an enlarged detail sectional view showing a forward axle head of the cutting machine of the present invention with the dual wheel assembly mounted and secured thereon, the dual wheel assembly being broken away to show only one of its wheel assemblies.

Figure 2:
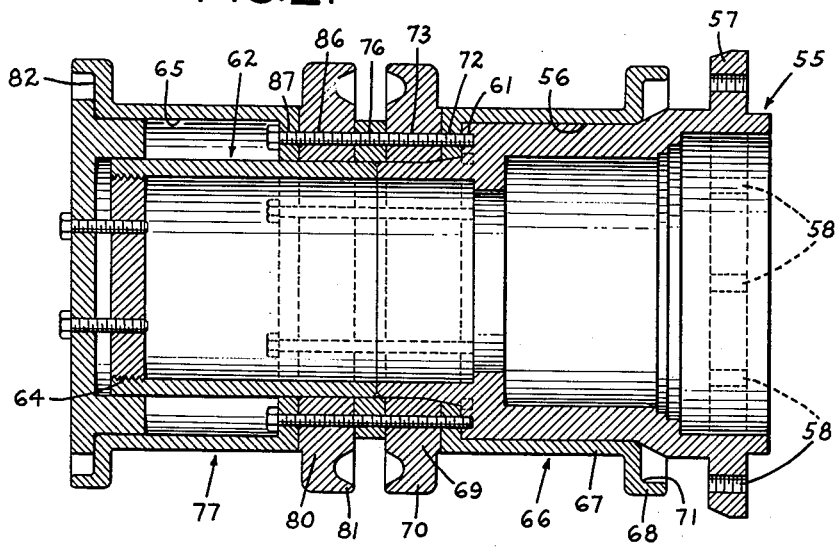
FIG. 2 is a detail sectional view of one of the dual wheel assemblies taken on line 2—2 of FIG. 3, the tires not shown for purposes of clarity.
Figure 6:
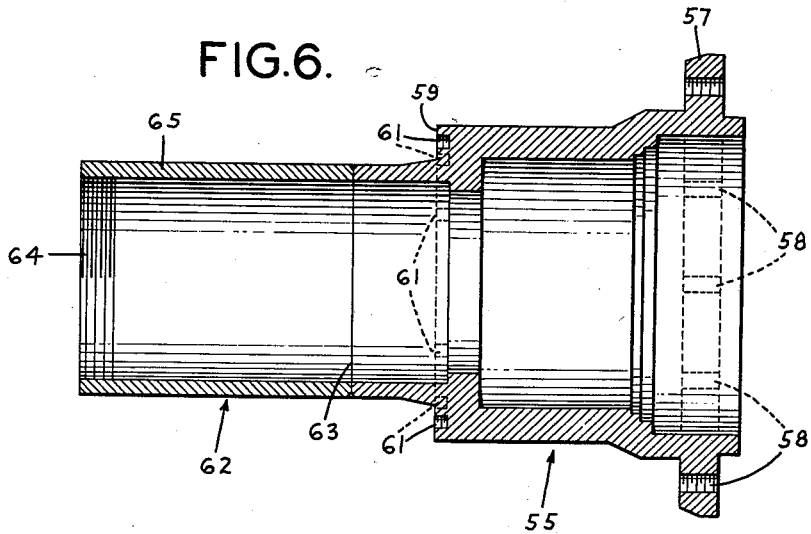
FIG. 6 is a longitudinal detail section of a hub and hub extension member integrally secured thereto.

Referring to FIGS. 1 and 3, the coal cutting machine which is improved by the present invention comprises main frame 15 and hydraulic tramming motors 16 and 17 for driving chains 18 and 19. Chains 18 and 19 drive sprockets 20 and 21 and hence the forward wheels causing the cutting machine to move forward towards the face of the mine vein. A cutting mechanism 22 comprising a guide frame 23 is mounted at the forward end portion of main frame 15 and projects outwardly therefrom. Endless driven loop chain 24 mounting a plurality of spaced, sharp, projecting cutting bits 25 is arranged and guided for circulation about guide frame 23 for forming a slot of substantial depth in the vein face as the cutting machine is moved forward. Chain 24 mounting the cutting bits is arranged at one looped end portion on the teeth of sprocket 26. Electric motor 27 is connected to sprocket 26 through a drive shaft and gear train (not shown) and drives the sprocket and hence the chain 24 to circulate the same about guide frame 23. Electric hydraulic pump motor 28 drives a hydraulic pump for furnishing hydraulic pressure used for steering and also for driving hydraulic tramming motors 16 and 17 for purposes of tramming, i.e. causing the machine to move forward. A reel (not shown) for the power cable, which leads from a source of electric power to supply the electric power for propelling and operating the cutting machine, is mounted on the rear portion of the cutting machine, electric motor 30 serving to operate the reel to let out and take up the wire as needed. The machine is steered by turning the rear wheels 29 only, the rear wheels being non-driven. Oil tank cover and oil tank cover with filler cap are designated at 31 and 32 respectively. The operator rides on either of platforms 33 and 34 as desired, control levers 35 and 36 being located closely adjacent the operator's platform by means of which the operator controls the operation of the machine. Hydraulic jacks are designated at 37 and 38. Boom roll 39 enables the cutting mechanism 22 to be moved to a horizontal cutting position as desired for cutting the slots in the vein face. Bumper 41 is provided at the front end of the machine and brackets 42 and 43 support the lights. Rear axle 44 is supported at the rearward portion of the machine and the steering rod for turning the rear wheels is designated at 45. Single tires 46 and 47 are mounted on the single rear wheel assemblies which are conventional assemblies. Lift handles 48 are provided for lifting the top cover 52 off the machine. Starting box 49 causes current to be supplied initially slowly to hydraulic pump motor 28 and subsequently in increasing amounts. The cutting machine is obtainable from the Joy Manufacturing Company as model 12–RB–MS–4–1.

In accordance with the invention, dual wheel assemblies designated generally as 50 and 51 in FIG. 3 and shown in FIG. 1 mounting dual tires are each detachably secured to the end portions of only the front axle 53. One end portion, i.e. the head of front axle 53 is shown in detail in FIG. 10. It is essential that the dual wheel assemblies are mounted only on the forward axle and that the single wheels be retained on the rear axle for attaining the improved cutting and improved sumping while reducing the frequency of breakdowns of the machine. As shown in FIGS. 2, 4 and 5, each dual wheel assembly comprises hub 55 having peripheral seat 56 for mounting a first wheel assembly and also having an annular flange 57 for securing thereto a drive sprocket, sprocket 20 being shown secured to hub 55 in FIG. 10. Edge face 59 of hub 55 has a plurality of spaced screw-threaded cavities 61 extending a substantial distance into the interior of hub 55 at edge face 59. Hub 55 is of steel, has typical dimensions of length of 11½ inches, inner diameters at its innermost end of 9.0025" at its intermediate portion of 5.625 and at its outer portion in the region where the hub extension member is welded thereto of 6.3745. Hub extension member 62 is welded to hub 55 at 63 and provides the additional length needed for the wheel assembly spacer member and the second wheel assembly. Hub 55 is extended by hub extension member 62 typical distance of 8½ inches. Hub extension member 62 was made from ½-inch mild steel plate, the steel plate being cut to the proper length and then butt welded with mild steel welding rods to form the tube-shaped hub extension member. The hub extension member 62 was machined to typical dimensions of outside diameter of 7.029 inches, inside diameter of 6.3437 inches, plus 0.006 inch inside diameter tolerance, and a wall thickness of 0.327 inch, plus 0.003 inch wall thickness tolerance. Outer end portion 64 of hub extension member 62 is screw-threaded on the inside for a distance of 1 inch from its outer end, the thread bore being typically 6.3995 inches and the thread depth typically 6.542 inches. Hub extension member 62 has peripheral seat 65 for mounting a second wheel assembly.

First wheel assembly 66 is mounted on peripheral seat 56 of hub 55 and comprises tire-mounting rim 67 having tire-retaining annular flange 68 at its inner end integral therewith, and separate ring 69 having flange 70 at its outer end. The tire-retaining annular flange 68 is of generally right-angular configuration with one leg thereof axially aligned and extending axially inward. Shoulder 71 is located at the base of flange 68 of rim 67. A plurality of spaced screw-threaded openings 72, shown in FIG. 5, extend through the entire thickness of the outer edge face of rim 67 of wheel assembly 66, and a plurality of spaced screw-threaded openings 73 also extend through the entire thickness of ring 69 of wheel assembly 66 for the purpose hereafter discussed. Rim 67 and ring 69 of wheel assembly 66 have registering central openings 74 and 74a respectively of slightly larger diameter than that of peripheral seat 56 of hub 55, to enable wheel assembly 66 to be mounted on peripheral seat 56. Rim 67 (exclusive of its flanged inner end 68) and ring 69 each has typical inner diameter of 7.034 inches.

Spacer member 75, also shown in FIG. 7, is necessary for providing adequate operating clearance between wheel assembly 66 and the second wheel assembly hereafter described. Spacer 75 has central opening 75a of slightly larger diameter than that of hub extension member 62 for mounting the spacer on extension member 62, the spacer having typical inner diameter of 7.034 inches. Spacer 75 was made from a mild steel plate metal and had typical inner diameter of 7.034 inches and outer diameter of 9.50 inches. A plurality of spaced screw-threaded openings 76 extend through the entire thickness of spacer 75, threaded openings 76 having similar diameter and screw threads as those of threaded openings 73, 72 and 61 of first wheel assembly ring 69 and rim 67 and hub shoulder 59 respectively.

Second wheel assembly 77 comprises tire-mounting rim 78 similar to first wheel assembly rim 67 and having tire-retaining annular flange 79 at its outer end, and separate ring 80 provided with flange 81 at its inner end. The tire-retaining annular flange 79 is of generally right-angular configuration with one leg thereof axially aligned and extending axially outward. Shoulder 82 is provided at the base of flange 79 of rim 78. Rim 78 and ring 80 have central openings 84 and 85 respectively of slightly larger diameter than that of the hub extension member 62 to enable the second wheel assembly to be mounted on hub extension member 62. Rim 78 (exclusive of its flanged outer end 79) and ring 80 each had typical inner diameter of 7.034 inches. A plurality of spaced screw-threaded openings 87 and 86 extend through the thickness of second wheel assembly rim 78 and ring 80 respectively and have similar diameters and threads as those of the screw-threaded openings of spacer 75, first wheel assembly ring 69 and rim 67 and of the screw-threaded cavities of hub edge 59. Bolts, for instance capscrews 88, shown in FIG. 10, are screwed through the registering openings of the second wheel assembly rim 78 and ring 80, spacer 75 and first wheel assembly ring 69 and rim 67 and into the screw-threaded cavities in edge face 59 of the hub to secure the first wheel assembly, spacer and second wheel assembly together and to the hub.

Disk 89 having screw-threaded edge face 90 with the threads complementary to the screw threads in outer end portion 64 of hub extension member 65 screws into the threaded outer end portion 64 of the hub extension member. Disk 89, made from a mild steel plate, has typical thickness of 1 inch, thread bore of 6.3995 inches and thread depth of 6.542 inches. Disk 89, also shown in FIG. 8, has spaced screw-threaded openings 91 extending through its entire thickness, there being typically 4 openings 91 each of typical diameter of ¾ inch. Threaded disk 89 enables installation of the end plate attachment hereafter discussed.

End plate 92 has annular member 93 integral therewith and projecting inwardly therefrom. End plate 92 has screw-threaded openings 94 in number corresponding to those in disk 89 and typically four such openings extending through its entire thickness and within the area encompassed by annular member 93. Openings 94 have diameters and screw threads similar to and registering with those of screw-threaded openings 91 of disk 89. End plate 92 was made from a mild steel plate and has typical largest diameter of 11.375" with the diameter of the area encompassed by annular member 93 being typically 9.250". End plate 92 is bolted to disk 89 (which is screwed into the threaded outer end portion of the hub extension member 62 as discussed) with bolts, for instance capscrews, end plate 92 fitting over outer end portion 64 of hub extension member 62 and engaging shoulder 82 of second wheel assembly rim flange 79.

With reference to FIG. 10 showing in detail the dual wheel assembly of the invention secured to the head of forward axle 53, axle head is shown at 98 and inner bearings are designated at 96 and outer bearings at 97. Cups 99 and cones 100 form part of the inner bearing assembly, and cups 101 and cones 102 part of the outer bearing assemblies. Drive sprocket 20, also shown in FIG. 1, is bolted to flange 57 of hub 55 of the dual wheel assembly by capscrews 103 screwed through registering screw-threaded openings 104 and 58 in sprocket 20 and flange 57 respectively. Chain 18, shown in FIG. 1, is arranged about the teeth 105 of sprocket 20 for driving the dual wheel assembly about axle 53.

In assembling the dual wheel assemblies of the present invention and securing the same on each end portion of forward axle 53, hub 55 is mounted over the head 98 and end portion of forward axle 53, inner bearings 96 together with their cups 99 and cones 100 and outer bearings 97 together with their cups 101 and cones 102 being first positioned about the outer end portion and head respectively as shown in FIG. 10. Sprocket 20 for driving the forward wheels by means of chain 18 driven by motor 16, shown in FIG. 1, is secured to hub 55 by means of bolts 103 such as capscrews screwed into registering screw-threaded openings 104 and 58 of sprocket 20 and hub flange 57 respectively. Rim 67 and ring 69 of the first wheel assembly are then mounted in that order on peripheral seat 56 of hub 55 by inserting hub extension member 62 through the central openings of the rim and ring. As mounted on hub seat 56, flanged end portion 68 of rim 67 is located more inwardly of the assembly than its opposite end with shoulder at the base of flange 68 facing the hug flange 57 while ring 69 is located more outwardly of the assembly. Spacer 75 is then mounted on hub extension member 62 through central opening 75a of the spacer and moved inwardly to engage the outer edge face of first wheel assembly ring 69. Ring 80 and rim 78 of the second wheel assembly are then mounted in that order on hub extension member 62 by inserting hub extension member 62 through the central openings of the ring and rim with the ring 80 being on the hub extension member in manner opposite the way similar ring 69 of the first wheel assembly is mounted, ring 80 engaging the outer edge face of spacer 75. Rim 78 is mounted on hub extension member 62 in manner opposite the way similar rim 67 of the first wheel assembly is mounted on the hub and with shoulder 82 at the base of flange being more outwardly of the assembly. With the screw-threaded openings 87 and 86 of the second wheel assembly rim and ring, the screw-threaded openings 76 of spacer 75, the screw-threaded openings 73 and 72 of the first wheel assembly ring and rim and the threaded cavities 61 of hub edge face 59 registering, bolts, for instance capscrews, are screwed through the registering openings 87, 86, 76, 73 and 72 starting from the second assembly rim 78 and into registering cavities 61 in the hub edge face 59 to secure the elements of the dual wheel assembly together in assembled relation and to the hub 55. The screw-threaded disk 89 is then screwed tightly into the screw-threaded outer end portion 64 of hub extension member 62, and end plate 92 is then fitted over hub extension outer end portion 64 and disk 89 with end plate annular member 93 engaging the shoulder 82 at the base of the second wheel assembly rim flange 79. With screw-threaded openings 94 and 91 in end plate 92 and disk 89 respectively registering, bolts, for instance capscrews, are screwed through the registering threaded openings 94 in the end plate and 91 in the disk to give additional strength and stability to the dual wheel assembly. Tires are mounted on the rims 67 and 78 of the first and second wheel assemblies before assembly of the dual wheels assembly on the hub extension member and hub tires are mounted on rims before assembly.

Use of the improved cutting machine of the present invention having the dual wheel assemblies only on the front axle with single wheels on the rear axle in the Main South Headings section of the Tralee (W. Va.) Mine of Allied Chemical Corporation over a period of 6 months has proven very successful and achieved the following advantages: (1) a faster cutting rate about 4% faster than the prior art cutting machine due to less sway of the machine as it cuts across the face of the coal seam; (2) faster sumping rate about 6% faster than the prior art machine; (3) maintenance expense for keeping the machine operating reduced by as much as 5%; (4) considerably less breakdowns of the machine during operation, this being no small item inasmuch as the machine costs in the neighborhood of $50,000.00; (5) more economical cutting operations, and (6) improved traction when maneuvering the cutting machine.

Although certain preferred embodiments of the invention have been disclosed for purpose of illustration, it will be evident that various changes and modifications may be made therein without departing from the scope and spirit of the invention.

What is claimed is:

1. A dual wheel assembly adapted for the front axle of a coal cutting machine comprising, in combination, (A) a hub mounted at the axle terminus, said hub having a cylindrical outer end portion and a peripheral seat for mounting a first wheel assembly, (B) bearing assembly associated with the hub and axle for rotation of said hub about said axle, (C) a first wheel assembly mounted on the peripheral seat of said hub and comprising a tire-mounting rim having a central opening of larger diameter than that of the hub, said rim having an annular tire-retaining flange integral therewith at its axially inner end portion; and a separate outer ring providing an axially outer tire-retaining flange and having a central opening of larger diameter than that of said hub, said first wheel assembly having an inner edge face and an outer edge face, (D) a cylindrical hub extension member having a peripheral seat and engaging the cylindrical outer end portion of the hub and integral therewith, (E) a spacer member having a central opening of larger diameter than that of the hub extension member, said spacer member also having an inner edge face and outer edge face, said spacer member mounted on the extension member with the inner edge face of the spacer member engaging the outer edge face of said first wheel assembly, (F) a second wheel assembly including a second tire-mounting rim, said rim having an annular tire-retaining flange integral therewith at its axially outer end portion with a shoulder at the base of said last-mentioned flange and a radially inwardly extending flange at its axially inner end portion mountedly engaging the peripheral seat of the hub extension member, said inwardly extending flange having an inner edge face, and a wheel assembly ring providing an axially inner tire-retaining flange and having an outer face engaging the inner edge face of said inwardly extending flange and an inner face of said ring engaging the outer edge face of the spacer member, (G) means connectably securing the first wheel assembly, spacer member, and second wheel assembly together and to said hub, (H) tires mounted on the rims of the first and second wheel assemblies, (I) an end plate having an annular member integral with an inner face thereof and projecting inwardly therefrom, said annular member disposed in the space between the outer end of the peripheral seat of the extension member and said second tire-mounting assembly, and (J) means securing the end plate to said dual wheel assembly to impart strength and stability to the outer end portion of the dual wheel assembly.

2. A dual wheel assembly adapted for the front axle of a coal cutting machine comprising, in combination, (A) a hub mounted at the axle terminus, said hub having a cylindrical outer end portion and a peripheral seat for mounting a first wheel assembly, said hub also having an intermediate portion of greater external diameter than that of said outer end portion, an edge face defined between said intermediate portion and outer end portion, and a plurality of spaced screw-threaded cavities extending into said hub edge face, (B) bearing assembly associated with the hub and axle for rotation of said hub about said axle, (C) a first wheel assembly mounted on the peripheral seat of said hub and comprising a tire-mounting rim, said rim having an annular tire-retaining flange integral therewith at its axially inner end portion and a central opening of larger diameter than that of the hub, and a separate outer ring providing an axially outer tire-retaining flange and having a central opening of larger diameter than that of said hub, said first wheel assembly having an inner edge face and an outer edge face, (D) a cylindrical hub extension member weldingly secured to the cylindrical outer end portion of the hub, said hub extension member having an internally screw-threaded outer end portion and a peripheral seat for mounting a second wheel assembly, (E) a spacer member having a central opening of larger diameter than that of the hub extension member, said spacer member also having an inner edge face and outer edge face, said spacer member mounted on the extension member with the inner edge face of the spacer member engaging the outer edge face of said first wheel assembly, (F) a second wheel assembly including a second tire-mounting rim, said rim having an annular tire-retaining flange integral therewith at its axially outer end portion with a shoulder at the base of said last-mentioned flange and a radially inwardly extending flange at its axially inner end portion mountedly engaging the peripheral seat of the hub extension member, said inwardly extending flange having an inner edge face, and a wheel assembly ring providing an axially inner tire-retaining flange and having an outer face engaging the inner edge face of said inwardly extending flange and an inner face of said ring engaging the outer edge face of the spacer member, (G) said second wheel assembly rim and ring, spacer member and first wheel assembly ring and rim having a plurality of registering spaced screw-threaded openings extending therethrough, said screw-threaded openings also registering with the screw-threaded cavities in the hub edge face, (H) capscrews screwed through the registering openings in respectively said second wheel assembly rim and ring, spacer member and first wheel assembly ring and rim and into the registering cavities in said hub edge face to secure the same together in assembled relation and to the hub, (I) a peripheral screw-threaded disk of substantial thickness having threads complementary to the screw threads in the hub extension member outer end portion screwed into the hub extension member outer end portion, said disk having a plurality of spaced screw-threaded openings extending therethrough, (J) an end plate having an annular member integral with an inner face thereof and projecting inwardly therefrom, said end plate having a plurality of spaced openings extending therethrough and registering with the openings through the disk, said end plate fitting over the hub extension member outer end and the disk outer face with the end plate engaging the shoulder at the second wheel rim outer end portion, (K) tires mounted on the rims of the first and second wheel assemblies of each dual wheel assembly, and (L) capscrews screwed through the registering screw-threaded openings in the end plate and disk to impart strength and stability to the outer end portion of the dual wheel assembly.

References Cited in the file of this patent

UNITED STATES PATENTS

| | | |
|---|---|---|
| 1,072,818 | Buckwalter | Sept. 9, 1913 |
| 1,769,296 | Klaus | July 1, 1930 |
| 1,861,187 | Lofland | May 31, 1932 |
| 2,332,546 | Arentzen | Oct. 26, 1943 |
| 2,387,159 | Lee | Oct. 16, 1945 |